United States Patent
Kao et al.

(10) Patent No.: US 8,742,621 B2
(45) Date of Patent: Jun. 3, 2014

(54) COMPUTER AND EXPANDABLE POWER SUPPLY SYSTEM THEREOF

(75) Inventors: Ting-Kuo Kao, Taipei (TW); Hsin-Ting Chen, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 1076 days.

(21) Appl. No.: 12/765,878

(22) Filed: Apr. 23, 2010

(65) Prior Publication Data

US 2010/0275042 A1    Oct. 28, 2010

(30) Foreign Application Priority Data

Apr. 28, 2009   (TW) ................................ 98114053 A

(51) Int. Cl.
| H02J 1/00 | (2006.01) |
| H02J 3/00 | (2006.01) |
| H02J 7/00 | (2006.01) |
| H02J 1/10 | (2006.01) |
| G06F 1/00 | (2006.01) |

(52) U.S. Cl.
USPC .................. 307/80; 307/43; 307/64; 307/65; 307/85; 713/300

(58) Field of Classification Search
None
See application file for complete search history.

(56) References Cited

U.S. PATENT DOCUMENTS

| 6,160,702 A | 12/2000 | Lee et al. | |
| 2005/0006956 A1* | 1/2005 | Shi | 307/43 |
| 2010/0131779 A1* | 5/2010 | Huang et al. | 713/300 |

FOREIGN PATENT DOCUMENTS

| CN | 101266514 | 9/2008 |
| TW | 200819963 | 5/2008 |
| TW | 200837546 | 9/2008 |

* cited by examiner

*Primary Examiner* — Jared Fureman
*Assistant Examiner* — Aqeel Bukhari
(74) *Attorney, Agent, or Firm* — Jianq Chyun IP Office

(57) ABSTRACT

The invention discloses a computer and an expandable power supply system. The expandable power supply system includes N interface units, a determination unit, and a voltage converting unit. N is an integer equal to or more than two. The interface units are electrically connected with at least one power supplies and switching the levels of (N−1) control signals according to conductance of the power supplies. When the interface units are electrically connected with $1^{st}$ to $M^{th}$ power supplies, the determination unit outputs a start signal when the determination unit receives power reply signals provided by the $1^{st}$ to $M^{th}$ power supplies. M is an integer, and $1 \leq M \leq N$. The voltage converting unit is enabled according to the start signal to distribute operation voltages provided by the $1^{st}$ to $M^{th}$ power supplies by utilizing the control signals to generate a supply voltage.

14 Claims, 4 Drawing Sheets

COMPUTER AND EXPANDABLE POWER SUPPLY SYSTEM THEREOF

CROSS-REFERENCE TO RELATED APPLICATION

This application claims the priority benefit of Taiwan application Ser. No. 98114053, filed on Apr. 28, 2009. The entirety of the above-mentioned patent application is hereby incorporated by reference herein and made a part of specification.

BACKGROUND OF THE INVENTION

1. Field of the Invention

The invention relates to a power supply device, and more particularly, to an expandable power supply system generating a supply voltage by utilizing one or more power supplies selectively.

2. Description of the Related Art

With the development of the science and technology, electronic products become more and more popular. The computer is very favored due to its diverse functions. For example, the computer may satisfy all requirements on different aspects such as work, travel, and entertainments, and it also may be used for processing personal financial details, privacy documents and photos, commercial documents, and intellectual work for users.

The supply of power is very important when the computer is used. Generally speaking, the computer must cooperate with a proper power supply in assembling according to its power consumption. The power supplies are mainly used for converting alternating current (AC) voltage to direct current (DC) voltage needed by the computer. Afterwards, the voltage converting unit of the computer utilizes the DC voltage outputted by the power supply to orderly generate the supply voltages needed by different components of the computer.

However, along with the innovation of electronic products, when the user upgrades the functions of the components in the computer by reassembling the computer, an old power supply always cannot provide enough watts to the upgraded computer. At that moment, the user always has to buy a new power supply with larger watts to meet the requirement of the upgraded computer. Consequently, not only a hardware cost is increased when the computer is upgraded, and the resource is wasted when an undamaged power supply is replaced.

BRIEF SUMMARY OF THE INVENTION

The invention provides an expandable power supply system adapted for one or more power supplies to reduce the hardware cost for upgrading electronic products.

The invention provides a computer. The power supplies may be added via the expandable power supply system to avoid a waste of resources.

The invention provides the expandable power supply system including N interface units, a determination unit, and a voltage converting unit. N is an integer equal to or more than two. N interface units are adapted for being electrically connected with N power supplies (may be at least one power supply). Additionally, N interface units switch the levels of (N−1) control signals according to conductance of the power supplies. When the N interface units is electrically connected with $1^{st}$ to $M^{th}$ power supplies, the determination unit outputs a start signal when the determination unit receives power reply signals provided by the $1^{st}$ to $M^{th}$ power supplies. M is an integer, and $1 \leq M \leq N$. As a result, the voltage converting unit is enabled according to the start signal to distribute operation voltages provided by the $1^{st}$ to $M^{th}$ power supplies by utilizing the control signals to generate a supply voltage.

In an embodiment of the invention, when a $(i+1)^{th}$ interface unit of the interface units is electrically connected with a $(i+1)^{th}$ power supply of the power supplies, the $(i+1)^{th}$ interface unit switches the level of an $i^{th}$ control signal of the control signals from a first level to a second level. M is more than 1, and i is an integer, and $1 \leq i \leq (M-1)$.

In an embodiment of the invention, the voltage converting unit includes a signal generator, N switch modules, (N−1) change-over switches, and a power output device. The signal generator outputs a plurality of switch signals according to the start signal. Each of the N switch modules has an input terminal, an output terminal, and a plurality of control terminals. Moreover, the input terminals of the switch modules are electrically connected with the interface units, respectively, to receive the operation voltages provided by the power supplies. Furthermore, the output terminals of the switch modules are electrically connected with each other, and the control terminals of the switch modules are used for receiving the switch signals to switch conducting states of the switch modules.

Additionally, in respect of the (N−1) change-over switches, a $j^{th}$ change-over switch of the change-over switches is electrically connected between the input terminal of a $j^{th}$ switch module of the switch modules and the input terminal of a $(j+1)^{th}$ switch module of the switch modules, and the $j^{th}$ change-over switch is switched to an off state according to a $j^{th}$ control signal at the second level of the control signals. j is an integer, and $1 \leq j \leq (N-1)$. On the other hand, the power output device is electrically connected with the output terminals of the switch modules to generate the supply voltage according to the conducting states of the switch modules.

On the other hand, the invention provides a computer including a main board, a power manager, and an expandable power supply system. The power manager and the expandable power supply system are disposed on the main board. The expandable power supply system includes N interface units, a determination unit, and a voltage converting unit. N is an integer equal to or more than two. In overall operation, N interface units are adapted for being electrically connected with N power supplies and the power manager.

Additionally, N interface units are adapted for being electrically connected with N power supplies and electrically connected with the power manager. When the interface units are electrically connected with the $1^{st}$ to $M^{th}$ power supplies, of the power supplies, the power manager transmits a power start signal to the $1^{st}$ to $M^{th}$ power supplies via the interface units to enable the $1^{st}$ to $M^{th}$ power supplies to start to supply power.

Additionally, the determination unit outputs a start signal when the determination unit receives power reply signals provided by the $1^{st}$ to $M^{th}$ power supplies. M is an integer, and $1 \leq M \leq N$. As a result, the voltage converting unit is enabled according to the start signal to utilize the control signals to distribute the operation voltages provided by the $1^{st}$ to $M^{th}$ power supplies to generate a supply voltage needed by the main board.

To sum up, one or more power supplies are connected via a plurality of interface units according to the invention. Additionally, the levels of the control signals generated by the interface units are correspondingly changed along with the change of the number of the connected power supplies. As a result, the voltage converting unit may redistribute the operation voltages provided by one or more power supplies according to the control signals, and generate the supply voltage accordingly.

As a result, the expandable power supply system may be adapted for one or more power supplies. Correspondingly, when the original power supply of the electronic product cannot provide enough watts to the upgraded electronic product, the user only needs to add external power supplies via the interface units in the expandable power supply system. Then, the electronic product is upgraded.

These and other features, aspects and advantages of the present invention will become better understood with regard to the following description, appended claims, and accompanying drawings.

DETAILED DESCRIPTION OF THE EMBODIMENTS

Figure 1A:
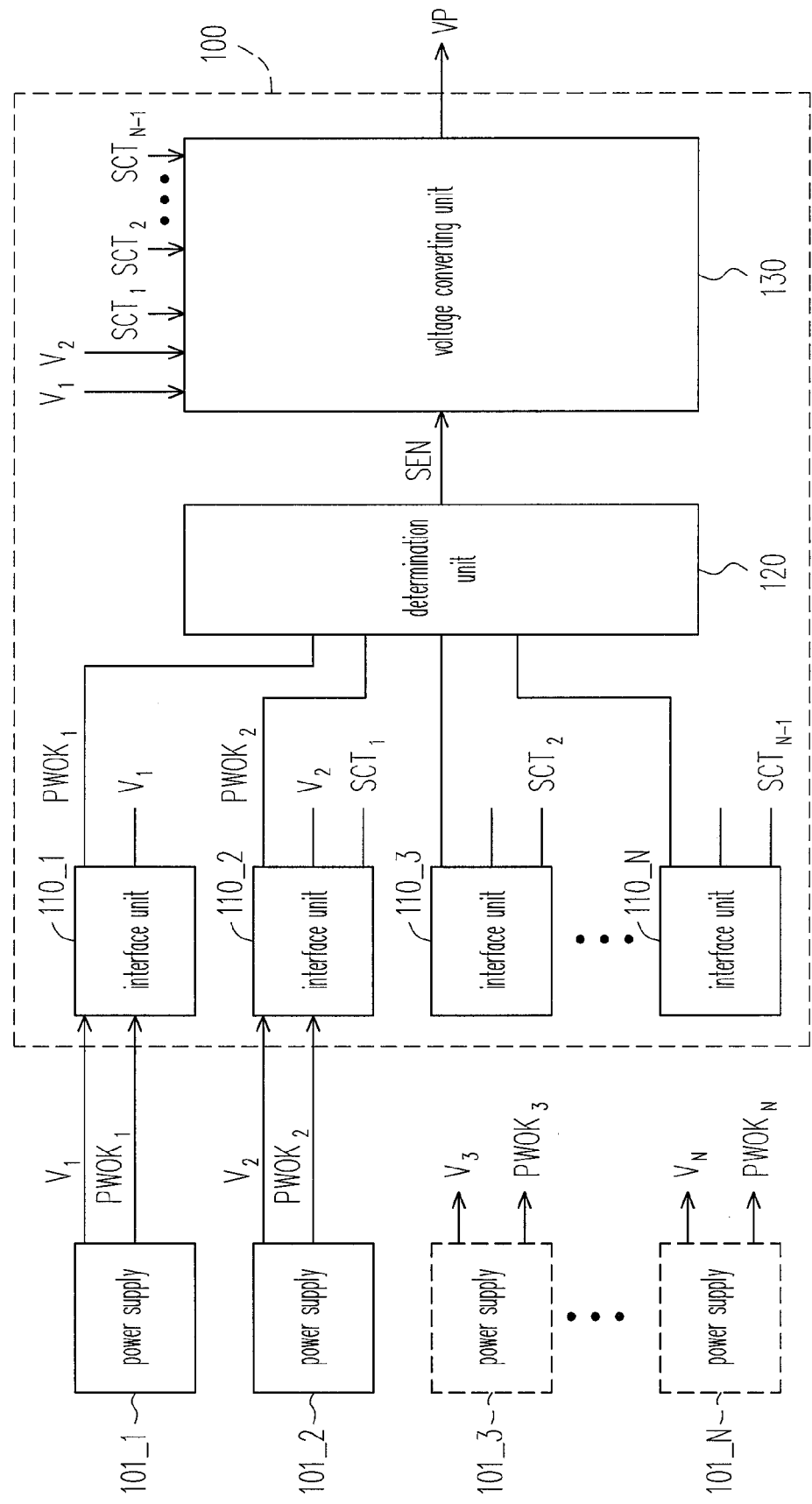
FIG. 1A is a block diagram showing an expandable power supply system according to an embodiment of the invention.

FIG. 1A is a block diagram showing an expandable power supply system according to an embodiment of the invention. In FIG. 1A, an expandable power supply system 100 includes N interface units 110_1 to 110_N, a determination unit 120, and a voltage converting unit 130. N is an integer equal to or more than two. That is, the expandable power supply system 100 in this embodiment at least includes two interface units 110_1 and 110_2.

In physical architecture, the interface units 110_1 to 110_N are adapted for being electrically connected with N power supplies 101_1 to 101_N and being used for transmitting signals such as power reply signals PWOK1 to PWOKN and operation voltages V1 to VN provided by the power supplies 101_1 to 101_N. Additionally, in practical usage, each of the interface units 110_1 to 110_N may be composed of a connector, but the invention is not limited thereto.

When the interface unit 110_1 is electrically connected with the power supply 101_1, the expandable power supply system 100 may receive the power reply signal PWOK1 and the operation voltage V1 via the interface unit 110_1. Similarly, when the interface unit 110_2 is electrically connected with the power supply 101_2, the expandable power supply system 100 receives the power reply signals PWOK2 and the operation voltage V2 via the interface unit 110_2. The mechanism of signal transmission between the expandable power supply system 100 and the power supplies 101_3 to 101_N may be obtained by analogy.

In this embodiment, it is supposed that the interface units 110_1 to 110_2 are electrically connected with the power supplies 101_1 and 101_2, respectively, and the interface units 110_3 to 110_N are not electrically connected with the power supplies 101_3 to 101_N to easily illustrate the invention. That is, in this embodiment, the expandable power supply system 100 may receive the power reply signals PWOK1 to PWOK2 and the operation voltages V1 to V2 via the interface units 110_1 to 110_2, which is taken as an example to illustrate the operation mechanism of the expandable power supply system 100 hereinafter.

In overall operation, the interface units 110_1 to 110_N switch the levels of the (N-1) control signals SCT1 to SCTN-1 according to conductance between them and the power supplies 101_1 to 101_N. For example, since the interface unit 110_2 is electrically connected with the power supply 101_2, the interface unit 110_2 switches the level of the control signal SCT1 from a first level to a second level. In contrast, since the interface units 110_3 to 110_N are not electrically connected with the power supplies 101_3 to 101_N, the levels of the control signals SCT2 to SCTN-1 ate kept at the first level.

On the other hand, since the determination unit 120 is electrically connected with the interface units 110_1 to 110_N, it can receive the power reply signals PWOK1 to PWOK2 provided by the power supplies 101_1 and 101_2. The determination unit 120 outputs a start signal SEN when it receives the power reply signals PWOK1 to PWOK2. The power supplies 101_1 and 101_2 output the power reply signals PWOK1 to PWOK2 when operation voltages V1 to V2 outputted by them reach a predetermined output degree such as 90%.

In other words, when both of the operation voltages V1 to V2 outputted by the power supplies 101_1 and 101_2 reach the predetermined degree, the determination unit 120 output the start signal SEN. At that moment, the voltage converting unit 130 is enabled according to the start signal SEN, and it distributes the operation voltages V1 to V2 provided by the power supplies 101_1 and 101_2 using the control signals SCT1 to SCTN-1 to generate a supply voltage VP. In this embodiment, assuming that the expandable power supply system 100 is electrically connected with the two power supplies 101_1 and 101_2, the voltage converting unit 130 utilizes the operation voltages V1 to V2 to generate the supply voltage VP.

If the expandable power supply system 100 is electrically connected with the power supplies 101_1 to 101_3 via the interface units 110_1 to 110_3, then, the determination unit 120 outputs the start signal SEN when it receives the power reply signals PWOK1 to PWOK3, and that is, the operation voltages V1 to V3 reach the predetermined degree. Additionally, the voltage converting unit 130 is enabled according to the start signal SEN and redistributes the operation voltages V1 to V3 provided by the power supplies 101_1 to 101_3 via the control signals SCT1 to SCTN-1 to generate the supply voltage VP.

In other words, the expandable power supply system 100 may be electrically connected with one or more power supplies via the interface units 110_1 to 110_N, and the levels of the control signals SCT1 to SCTN-1 are correspondingly changed along with different numbers of the power supplies. As a result, under the operation of the control signals SCT1 to SCTN-1, the voltage converting unit 130 may utilize the operation voltages provided by one or more power supplies to generate the supply voltage VP.

That is, the expandable power supply system 100 is adapted for one or more power supplies. Consequently, when the expandable power supply system 100 is utilized at an electronic product, and the user finds that the original power supply in the electronic product cannot provide enough watts to the upgraded electronic product, the user can only upgrade the electronic product by installing an additional power supply via the interface units of the expandable power supply system 100.

Figure 1B:
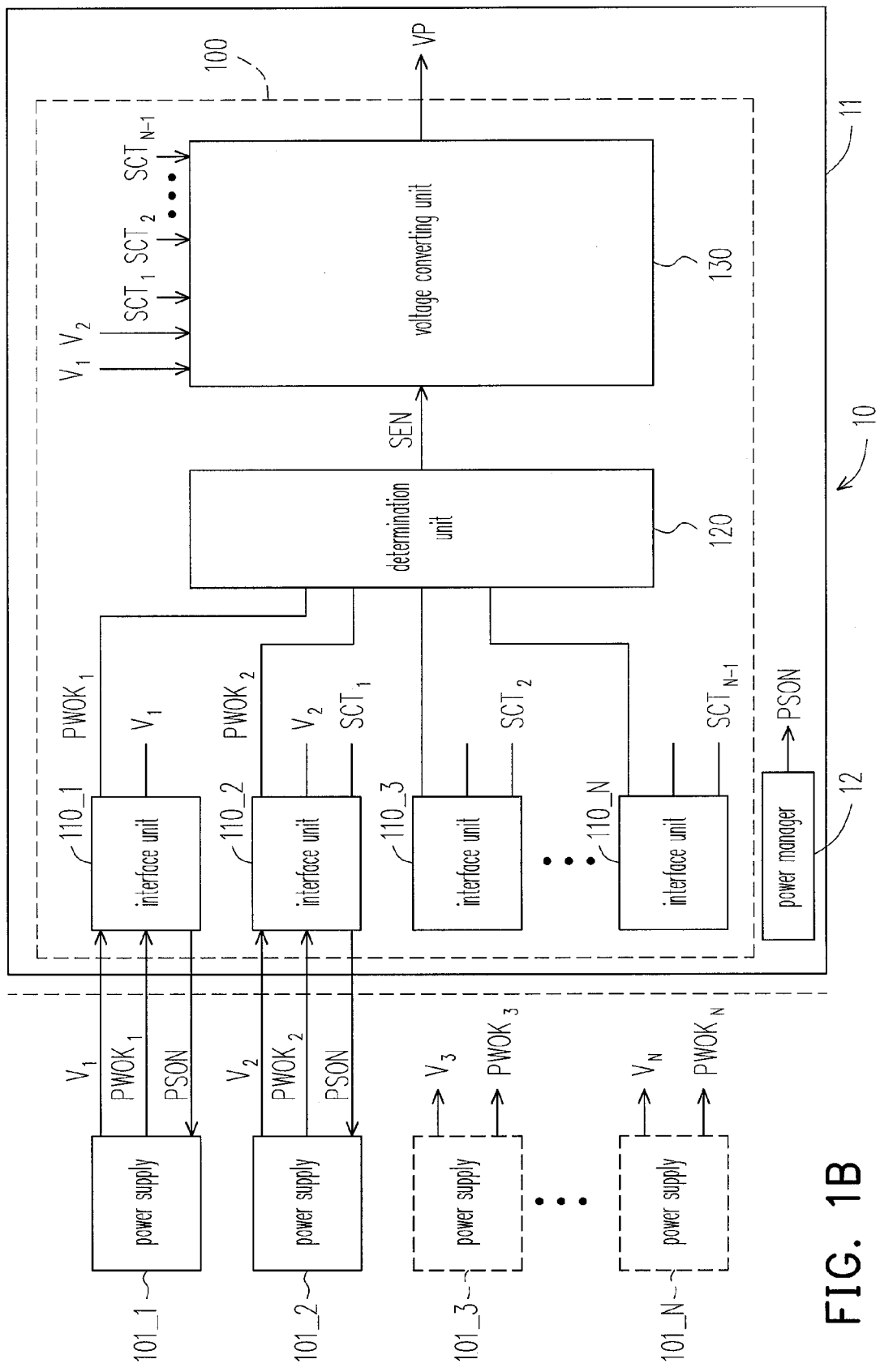
FIG. 1B is a block diagram showing an computer according to an embodiment of the invention.

For example, as shown in FIG. 1B, when the expandable power supply system 100 is utilized at the computer, the computer 10 includes a main board 11, a power manager 12, and an expandable power supply system 100. The power manager 12 and the expandable power supply system 100 are disposed on the main board 11. Furthermore, the power manager 12 is electrically connected with the interface units 110_1 to 110_N. As a result, when the power manager 12 transmits a power start signal PSON, the interface units 110_1 to 110_N transmit the power start signal PSON to the power supplies electrically connected with the computer 10.

In this embodiment, it is supposed that the interface units 110_1 to 110_2 are electrically connected with the power supplies 101_1 and 101_2, respectively. Consequently, at that moment, the power start signal PSON is transmitted to the power supplies 110_1 and 110_2 via the interface units 110_1 and 110_2, respectively, to make the power supplies 110_1 and 110_2 start to supply power. That is, the power supplies 110_1 and 110_2 start to generate the operation voltages V1 and V2, respectively, and output the power reply signals PWOK1 and PWOK2 when the operation voltages V1 and V2 reach the predetermined degree.

At that moment, the expandable power supply system 100 receives the power reply signals PWOK1 to PWOK2 and the operation voltages V1 to V2 via the interface units 110_1 to 110_2. Relating operation mechanisms are described within the above embodiment, and they are not described herein for a concise purpose. When the user wants to upgrade the computer 10, and the original power supplies 110_1 and 110_2 cannot provide enough watts to the upgraded computer 10, the user may add additional power supplies via the interface units 110_3 to 110_N to solve the problem that the power of the original power supplies 110_1 and 110_2 is not enough.

Additionally, if power connectors provided by the original power supplies 110_1 and 110_2 are not enough for peripheral components (such as a floppy disk drive, a hard disk drive, an internal fan, and an interface graphics card) needing power in the computer 10, the additional power supplies may provide the power connectors for the peripheral components of the computer 10. In other words, the more the additional power supplies are, the more the power connectors for the peripheral components of the computer 10 are. As a result, not only the resource is fully utilized, the hardware cost for upgrading the computer 10 is reduced.

The determination unit 120 and the voltage converting unit 130 of the expandable power supply system 100 are further illustrated hereinafter to allow persons having ordinary skill in the art to further understand the invention.

Figure 2:
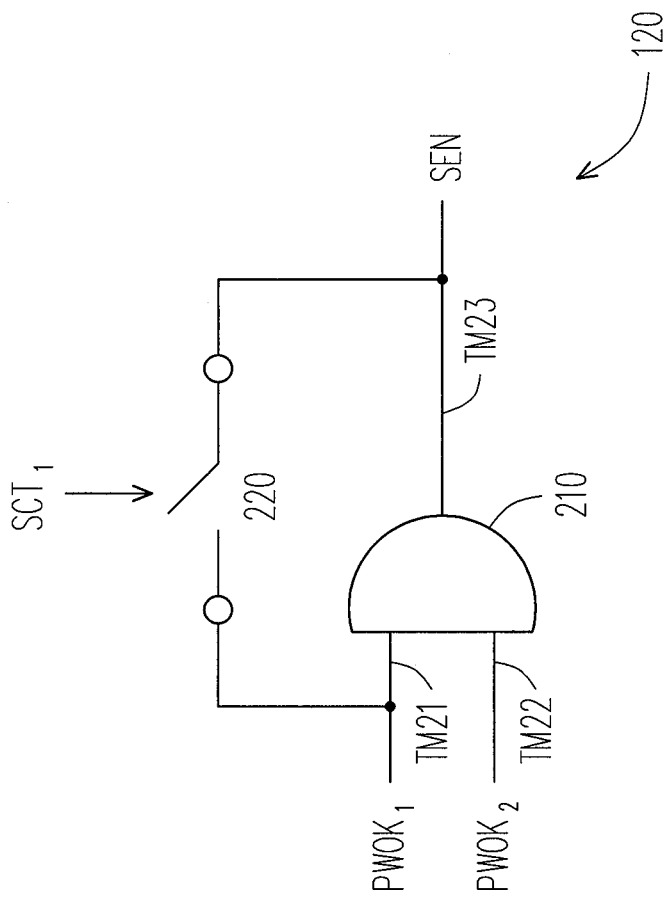
FIG. 2 is an architectural diagram showing a circuit of a determination unit according to an embodiment of the invention.

FIG. 2 is an architectural diagram showing a circuit of a determination unit according to an embodiment of the invention. In this embodiment, it is supposed that N equals to two, that is, the expandable power supply system 100 only includes the two interface units 110_1 and 110_2, and the start signal SEN and the power reply signals PWOK1 and PWOK2 are at high voltage levels. The detail architecture of the determination unit 120 may be the one shown in FIG. 2.

In FIG. 2, the determination unit 120 includes an AND gate 210 and a switch 220. The AND gate 210 has an input terminal TM21, an input terminal TM22, and an output terminal TM23. The input terminals TM21 and TM22 of the AND gate 210 are electrically connected with the interface units 110_1 and 110_2, respectively, to receive the power reply signals PWOK1 and PWOK2 provided by the power supplies 110_1 and 110_2. Furthermore, the first terminal of the switch 220 is electrically connected with the input terminal TM21 of the AND gate 220, and the second terminal is electrically connected with the output terminal TM23 of the AND gate 220.

When the expandable power supply system 100 is only electrically connected with the power supply 101_1 via the interface units 110_1, the control signal SCT1 is kept at the first level to keep the switch 220 at an on state. At that moment, the power reply signal PWOK1 generated by the power supply 101_1 is directly transmitted to the output terminal TM23 of the AND gate 220 via the switch 220. In other words, as long as the operation voltage V1 outputted by the power supply 101_1 reaches the predetermined degree, and that is, the power supply 101_1 transmits the power reply signal PWOK1 to the determination unit 120, the determination unit 120 immediately generates the start signal SEN.

On the other hand, when the expandable power supply system 100 is electrically connected with the two power supplies 110_1 and 110_2 via the interface units 110_1 and 110_2, respectively, the control signal SCT2 is switched to the second level to keep the switch 220 at the off state. At that moment, only when the AND gate 210 receive the power reply signals PWOK1 and PWOK2 at high voltage levels at the same time, it may generate the start signal SEN at the high voltage level. In other words, when both of the operation voltages V1 to V2 outputted by the power supplies 101_1 and 101_2 reach the predetermined degree, the determination unit 120 outputs the start signal SEN.

Figure 3:
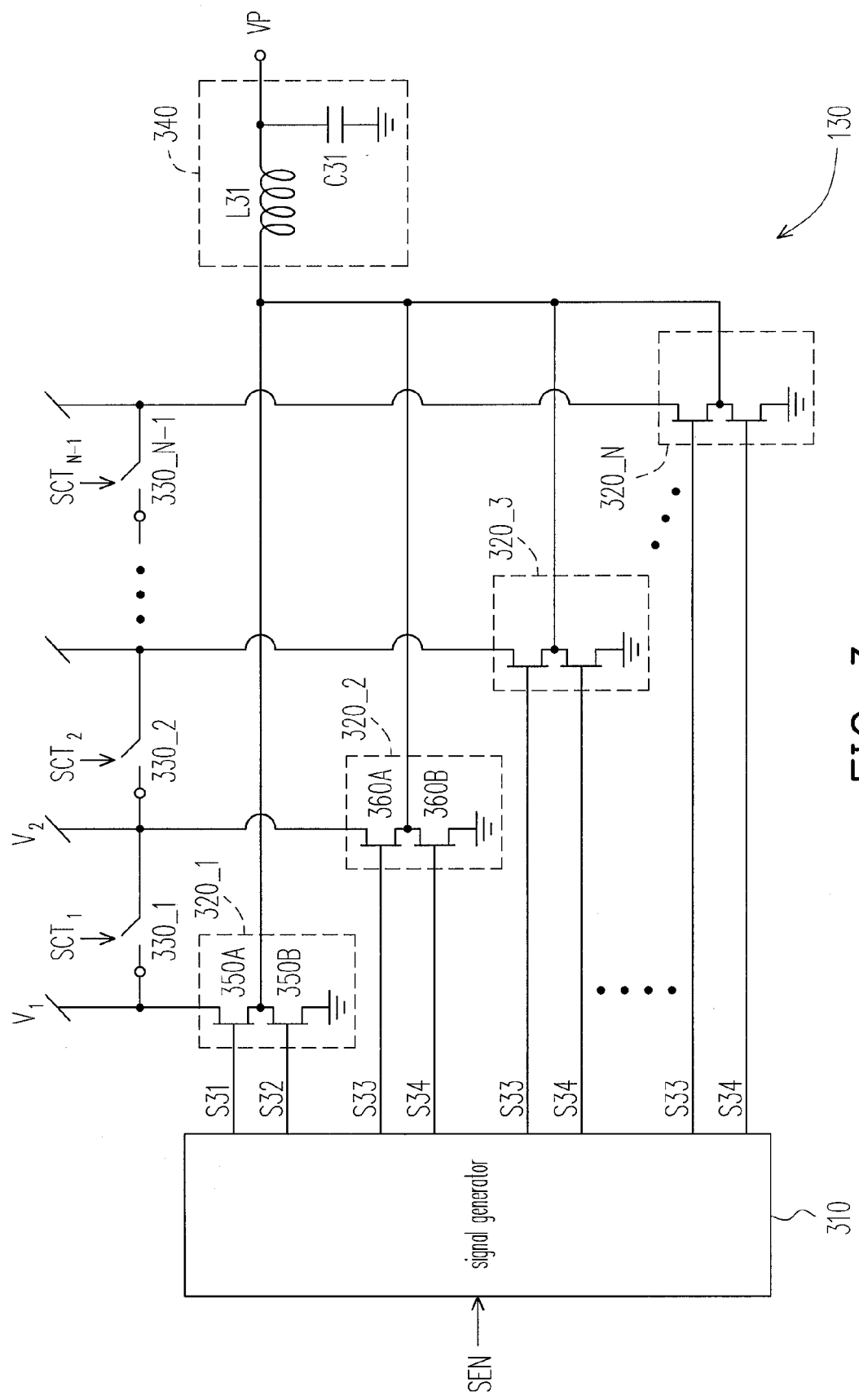
FIG. 3 is an architectural diagram showing a circuit of a voltage converting unit according to an embodiment of the invention.

FIG. 3 is an architectural diagram showing a circuit of a voltage converting unit according to an embodiment of the invention. The voltage converting unit 130 includes a signal generator 310, N switch modules 320_1 to 320_N, (N−1) change-over switches 330_1 to 330_N−1, and a power output device 340. The switch modules 320_1 to 320_N are electrically connected with the signal generator 310.

Additionally, each of the switch modules 320_1 to 320_N has an input terminal, an output terminal, and a plurality of control terminals. The input terminals of the switch modules 320_1 to 320_N are electrically connected with the interface units 110_1 to 110_N, respectively, to receive the operation voltages V1 to VN from the power supplies 101_1 to _101_N. For example, in this embodiment, since the expandable power supply system 100 is only electrically connected with the power supplies 101_1 and 101_2 via the interface units 110_1 to 110_2, respectively, the input terminals of the switch modules 320_1 to 320_2 may receive the operation voltages V1 to V2, respectively.

The output terminals of the switch modules 320_1 to 320_N are electrically connected with each other, and electrically connected with the power output device 340. Furthermore, the control terminals of the switch modules 320_1 to 320_N are used for receiving a plurality of switch signals S31 to S38 outputted by the signal generator 310. As a result, when the signal generator 310 outputs the switch signals S31 to S38 according to the start signal SEN, the switch modules 320_1 to 320_N switch their conducting states accordingly to make the power output device 340 generate the corresponding supply voltage VP according to the conducting states of the switch modules 320_1 to 320_N.

To make the operation voltages V1 to V2 received by the input terminals of the switch modules 320_1 to 320_2 distributed to the other switch modules 320_3 to 320_N, (N−1) change-over switches 330_1 to 330_N−1 are connected between the input terminals of the N switch modules 320_1 to 320_N interlacedly. For example, the change-over switch 330_1 is electrically connected between the input terminals of the switch modules 320_1 and 320_2. The change-over switch 330_2 is electrically connected between the input terminals of the switch modules 320_2 and 320_3. The connection relationships between the change-over switches 330_3 to 330_N−1 and the switch modules 320_3 to 320_N may be obtained by analogy.

In operation, the change-over switches 330_1 to 330_N−1 switch their states according to the control signals SCT1 to SCTN−1. For example, when the interface units 110_2 are electrically connected with the power supplies 101_2, the level of the control signal SCT1 is switched to the second level to switch the state of the change-over switch 330_1 from the on state to the off state. At that moment, the operation voltage V1 received by the input terminal of the switch module 320_1 cannot be distributed to the switch modules 320_2.

Additionally, since the interface unit 110_3 is not electrically connected with the power supply 101_3, the control signal SCT2 is kept at the first level to keep the change-over switch 330_2 in the on state. Then, the operation voltage V2 received by the input terminal of the switch module 320_2 is distributed to the switch module 320_3. Similarly, since the other control signals SCT3 to SCTN−1 are also kept at the first level, the change-over switches 330_3 to 330_N−1 are also kept in on state to make the operation voltage V2 received by the input terminal of the switch module 320_2 distributed to the switch modules 320_3 to 320_N.

In other words, along with the state change of the change-over switches 330_3 to 330_N−1, regardless of the number of the operation voltages received by the voltage converting unit 130, which may be one or more than one, the switch modules 320_3 to 320_N can receive the operation voltages distributed from the power supplies. That is, regardless of the number of the operation voltages received by the voltage converting unit 130, which may be one or more than one, the signal generator 310 may operate the N switch modules 320_1 to 320_N to make the power output device 340 generate the supply voltage VP.

Furthermore, each of the switch modules 320_1 to 320_N includes two driven switches. For example, the switch module 320_1 includes driven switches 350A and 350B. A first terminal of the driven switch 350A is electrically connected with the input terminal of the corresponding switch module 320_1, and a second terminal of the driven switch 350A is electrically connected with the output terminal of the switch module 320_1. Moreover, the first terminal of the driven switch 350B is electrically connected with the second terminal of the driven switch 350A, and the second terminal of the driven switch 350B is electrically connected with a grounding voltage. In overall operation, the driven switches 350A and 350B are controlled by the switch signals S31 and S32, respectively, to switch their conducting states accordingly.

Similarly, the switch module 320_2 includes driven switches 360A and 360B. The first terminal of the driven switch 360A is electrically connected with the input terminal of the switch module 320_2, and the second terminal of the driven switch 360A is electrically connected with the output terminal of the corresponding switch modules 320_2. Additionally, the first terminal of the driven switch 360B is electrically connected with the second terminal of the driven switch 360A, and the second terminal of the driven switch 360B is electrically connected with the grounding voltage. In overall operation, the driven switches 360A and 360B are controlled by the switch signals S33 and S34, respectively, to switch their conducting states accordingly. The circuit architecture and operating principles of the switch modules 320_3 to 320_N may be obtained by analogy.

As shown in FIG. 3, the power output device 340 includes an inductor L31 and a capacitor C31. The first terminal of the inductor L31 is electrically connected with the output terminals of the switch modules 320_1 to 320_N, and the second terminal of the inductor L31 is used for outputting the supply voltage VP. The first terminal of the capacitor C31 is electrically connected with the second terminal of the inductor L31, and the second terminal of the capacitor C31 is electrically connected with the grounding voltage. As a result, along with the change of the conducting states of the switch modules 320_3 to 320_N, the power output device 340 outputs the corresponding supply voltage VP accordingly.

To sum up, one or more power supplies are connected via a plurality of interface units according to the invention. Additionally, the levels of the control signals generated by the interface units are correspondingly changed along with the change of the number of the connected power supplies. As a result, the voltage converting unit may redistribute the operation voltages provided by one or more power supplies according to the control signals and generate the supply voltage accordingly. Consequently, the expandable power supply system may be adapted for one or more power supplies. Correspondingly, the user may dispose corresponding number of the power supplies according to the power consumption of the electronic products, and he or she does not need to buy a new power supply. In other words, not only the resource is fully utilized according to the expandable power supply system of the invention, the hardware cost for upgrading the electronic products is also reduced.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. An expandable power supply system, comprising:
    N interface units adapted for being electrically connected with N power supplies and switching the levels of (N−1) control signals according to conductance of the power supplies, wherein N is an integer, N is equal to or more than two;
    a determination unit electrically connected with the interface units, wherein when the interface units are electrically connected with $1^{st}$ to $M^{th}$ power supplies of the N power supplies, the determination unit outputs a start signal when the determination unit receives power reply signals provided by the $1^{st}$ to $M^{th}$ power supplies, M is an integer, and $1 \leq M \leq N$; and
    a voltage converting unit enabled according to the start signal to distribute operation voltages provided by the $1^{st}$ to $M^{th}$ power supplies by utilizing the control signals to generate a supply voltage.

2. The expandable power supply system according to claim 1, when a $(i+1)^{th}$ interface unit of the N interface units is electrically connected with a $(i+1)^{th}$ power supply of the M power supplies, the $(i+1)^{th}$ interface unit switches the level of an $i^{th}$ control signal of the control signals from a first level to a second level, M is more than 1, i is an integer, and $1 \leq i \leq (M−1)$.

3. The expandable power supply system according to claim 2, wherein the voltage converting unit comprises:
    a signal generator outputting a plurality of switch signals according to the start signal;
    N switch modules, wherein each of the N switch modules has an input terminal, an output terminal, and a plurality of control terminals, the input terminals of the switch modules are electrically connected with the interface units, respectively, to receive the operation voltages provided by the power supplies, the output terminals of the switch modules are electrically connected with each other, and the control terminals of the switch modules are used for receiving the switch signals to switch conducting states of the switch modules;

(N−1) change-over switches, wherein a $j^{th}$ change-over switch of the change-over switches is electrically connected between the input terminal of a $j^{th}$ switch module of the switch modules and the input terminal of a $(j+1)^{th}$ switch module of the switch modules, and the $j^{th}$ change-over switch is switched to an off state according to a $j^{th}$ control signal at the second level of the control signals, j is an integer, and 1≤j≤(N−1); and a power output device electrically connected with the output terminals of the switch modules to generate the supply voltage according to the conducting states of the switch modules.

4. The expandable power supply system according to claim 3, wherein each of the switch modules comprises:

a first driven switch, wherein a first terminal of the first driven switch is electrically connected with the input terminal of a corresponding switch module, and a second terminal of the first driven switch is electrically connected with the output terminal of the corresponding switch module; and a second driven switch, wherein a first terminal of the second driven switch is electrically connected with the second terminal of the first driven switch, a second terminal of the second driven switch is electrically connected with a grounding voltage, and the first driven switch and the second driven switch are controlled by partial switch signals of the switch signals.

5. The expandable power supply system according to claim 3, wherein the power output device comprises:

an inductor, wherein a first terminal of the inductor is electrically connected with the output terminals of the switch modules, and a second terminal of the inductor is used for outputting the supply voltage; and a capacitor, wherein a first terminal of the capacitor is electrically connected with the second terminal of the inductor, and a second terminal of the capacitor is electrically connected with a grounding voltage.

6. The expandable power supply system according to claim 2, wherein N equals to two, and the determination unit comprises:

an AND gate having a first input terminal and a second input terminal for receiving the power reply signals provided by the $1^{st}$ power supply and the $2^{nd}$ power supply of the power supplies, and having an output terminal to generate the start signal; and a switch, wherein a first terminal of the switch is electrically connected with the first input terminal of the AND gate, a second terminal of the switch is electrically connected with the output terminal of the AND gate, and the switch is switched to an off state according to the $1^{st}$ control signal at the second level.

7. The expandable power supply system according to claim 1, wherein each of the interface units is composed of a connector.

8. A computer, comprising:
a main board;
a power manager disposed on the main board; and
an expandable power supply system disposed on the main board, wherein the expandable power supply further includes:
N interface units adapted for being electrically connected with N power supplies and electrically connected with the power manager, wherein the interface units switch the levels of (N−1) control signals according to conductance between the interface units and the power supplies, and wherein N is equal to or more than two;

a determination unit electrically connected with the interface units, wherein when the interface units are electrically connected with $1^{st}$ to $M^{th}$ power supplies, the power manager transmits a power start signal to the $1^{st}$ to $M^{th}$ power supplies, via the interface units to enable the $1^{st}$ to $M^{th}$ power supplies to start to supply power, the determination unit outputs a start signal when the determination unit receives power reply signals provided by the $1^{st}$ to $M^{th}$ power supplies, M is an integer, and 1≤M≤N; and a voltage converting unit enabled according to the start signal to utilize the control signals to distribute the operation voltages provided by the $1^{st}$ to $M^{th}$ power supplies to generate a supply voltage needed by the main board.

9. The computer according to claim 8, wherein when a $(i+1)^{th}$ interface unit of the interface units is electrically connected with a $(i+1)^{th}$ power supply of the power supplies, the $(i+1)^{th}$ interface unit switches the level of an $i^{th}$ control signal of the control signals from a first level to a second level, M is larger than one, i is an integer, and 1≤i≤(M−1).

10. The computer according to claim 9, wherein the voltage converting unit comprises:

a signal generator outputting a plurality of switch signals according to the start signal;

N switch modules, wherein each of the N switch modules has an input terminal, an output terminal, and a plurality of control terminals, the input terminals of the switch modules are electrically connected with the interface units, respectively, to receive the operation voltages provided by the power supplies, the output terminals of the switch modules are electrically connected with each other, and the control terminals of the switch modules are used for receiving the switch signals to switch conducting states of the switch modules;

(N−1) change-over switches, wherein a $j^{th}$ change-over switch of the change-over switches is electrically connected between the input terminal of a $j^{th}$ switch module of the switch modules and the input terminal of a $(j+1)^{th}$ switch module of the switch modules, and the $j^{th}$ change-over switch is switched to an off state according to a $j^{th}$ control signal at the second level of the control signals, j is an integer, and 1≤j≤(N−1); and a power output device electrically connected with the output terminals of the switch modules to generate the supply voltage according to the conducting states of the switch modules.

11. The computer according to claim 10, wherein each of the switch modules comprises:

a first driven switch, wherein a first terminal of the first driven switch is electrically connected with the input terminal of a corresponding switch module, and a second terminal of the first driven switch is electrically connected with the output terminal of the corresponding switch module; and a second driven switch, wherein a first terminal of the second driven switch is electrically connected with the second terminal of the first driven switch, a second terminal of the second driven switch is electrically connected with a grounding voltage, and the first driven switch and the second driven switch are controlled by partial switch signals of the switch signals.

12. The computer according to claim 10, wherein the power output device comprises:

an inductor, wherein a first terminal of the inductor is electrically connected with the output terminals of the switch modules, and a second terminal of the inductor is used for outputting the supply voltage; and a capacitor, wherein a first terminal of the capacitor is electrically connected with the second terminal of the inductor, and a second terminal of the capacitor is electrically connected with a grounding voltage.

13. The computer according to claim 9, wherein N equals to two, and the determination unit comprises:

an AND gate having a first input terminal and a second input terminal to receive the power reply signals provided by the $1^{st}$ power supply and the $2^{nd}$ power supply of the power supplies, and having an output terminal to generate the start signal; and a switch, wherein a first terminal of the switch is electrically connected with the first input terminal of the AND gate, a second terminal of the switch is electrically connected with the output terminal of the AND gate, and the switch is switched to the off state according to the $1^{st}$ control signal at the second level.

14. The computer according to claim 8, wherein each of the interface units is composed of a connector.

\* \* \* \* \*